United States Patent [19]

Yamaguchi et al.

[11] Patent Number: 5,308,170
[45] Date of Patent: May 3, 1994

[54] LINEAR GUIDE APPARATUS

[75] Inventors: Toshiaki Yamaguchi, Maebashi; Nobuyuki Osawa, Takasaki, both of Japan

[73] Assignee: NSK Ltd., Tokyo, Japan

[21] Appl. No.: 94,349

[22] Filed: Jul. 21, 1993

[30] Foreign Application Priority Data

Jul. 30, 1992 [JP] Japan .................. 4-203919

[51] Int. Cl.⁵ .............................. F16C 29/06
[52] U.S. Cl. ........................ 384/45; 384/43
[58] Field of Search ..................... 384/43, 44, 45

[56] References Cited

U.S. PATENT DOCUMENTS 4,557,532 12/1985 Teramachi .................. 384/45
4,844,624 7/1989 Teramachi .................. 384/45

FOREIGN PATENT DOCUMENTS 0057718 2/1990 Japan ..................... 384/43
3-53497 8/1991 Japan .

Primary Examiner—Thomas R. Hannon
Attorney, Agent, or Firm—Shapiro and Shapiro

[57] ABSTRACT

A linear guide apparatus which can be applied to both straight rail and curved rail comprising a pair of upper and lower rolling grooves and for rolling members are formed in each side surfaces of a guide rail. A pair of upper and lower grooves for loaded rolling members, which respectively correspond to the rolling grooves, are formed in each inner surfaces of a slider which straddle the guide rail. One of the rolling grooves is a straight rolling groove which is formed to be parallel with the corresponding straight groove formed in the opposite inner surface of the slider. The other of the rolling grooves is a curved rolling groove in circular arc shape which has the same curvature as the corresponding curved rolling groove formed in the opposite inner surface of the slider.

3 Claims, 6 Drawing Sheets

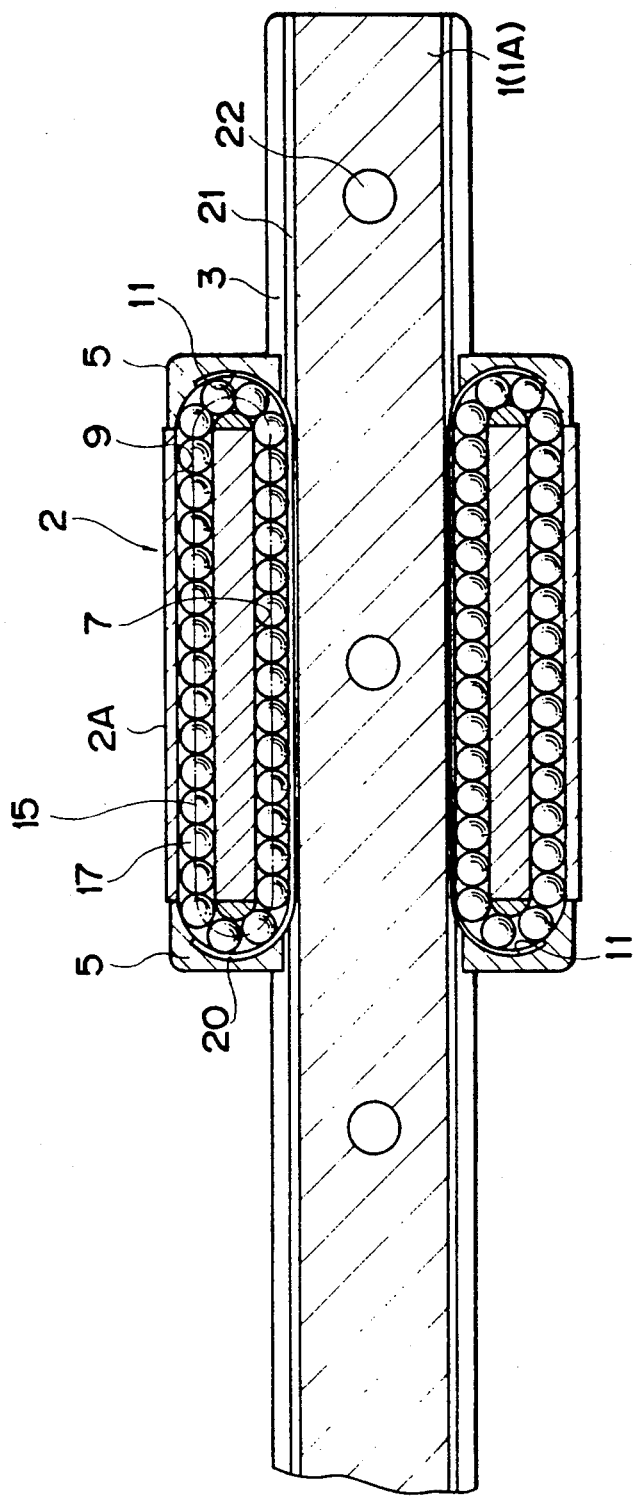

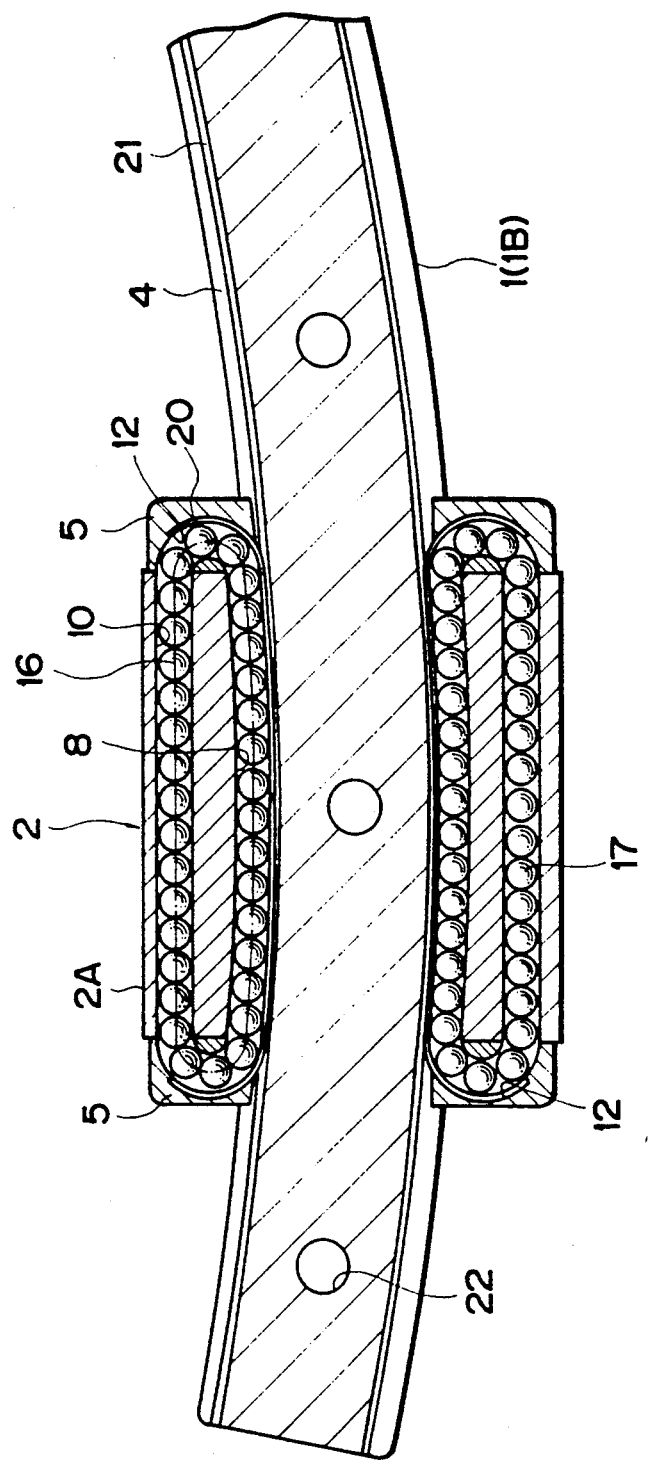

LINEAR GUIDE APPARATUS

BACKGROUND OF THE INVENTION

1. Field of the Invention

The present invention relates to a linear guide apparatus used in a machine tool, a conveyer device, and the like. More specifically, the present invention relates to a linear guide apparatus which can be applied when guide rails are not only straight rails, but also curved rails, or combinations thereof.

2. Related Background Art

A linear guide apparatus generally comprises guide rails which extend in the axial direction and a slider which engages with the guide rails and can move relatively thereto, wherein a pair of upper and lower ball rolling grooves parallel with each other are formed on each side surface of the guide rails. On the other hand, loaded ball rolling grooves corresponding to respective ball rolling grooves of the guide rails are formed on both inner surfaces of the slider. Further, ball circulation paths to be communicated with respective loaded ball rolling grooves are formed inside the slider. A multitude of balls endlessly circulate through the ball circulation paths and the loaded ball rolling grooves. As the balls roll in the loaded ball rolling grooves, they carry the load so that the slider can smoothly shift along the guide rails.

In the linear guide apparatus having the above-mentioned constitution, the slider is guided, in most cases, by straight guide rails so as to shift straight. But in some cases, an object which is fixed to a table has to be guided and carried not only along a straight path but also along a curved path or combinations thereof. A bearing apparatus for both linear and curved rails which can be used in all the has been disclosed in U.S. Pat. No. 4,844,624.

In this conventional apparatus, straight load carrying region(s) and curved load carrying region(s) of predetermined curvature are provided together in the same loaded ball rolling groove (load carrying surface) which is part of an endless track in a slider (bearing). When ball rolling grooves (track surfaces) of the guide rails (railways) are straight, the balls rolling in the straight load carrying regions carry the load. On the other hand, when the ball rolling grooves are curved, the balls rolling in the curved load carrying regions carry the load.

In the above-mentioned conventional apparatus, however, as the straight load carrying region(s) and the curved load carrying region(s) with predetermined curvature are alternately provided in the same loaded ball rolling groove, the following problem will happen when the slider moves along the curved portions of the guide rail.

That is, as schematically shown in FIG. 8, the load is given to the balls in the curved load carrying regions B, D and F of the loaded ball rolling grooves of the slider 2, while the balls in the straight load carrying regions A, C and E are not restricted by the ball rolling grooves of the guide rail 1 and shift rolling freely along the endless circulation paths. As a result, the balls rolling in the straight load carrying regions A, C and E rattle to make a big noise. Similarly, when the slider 2 moves along the straight portions of the guide rail 1, the balls in the curved load carrying regions B, D and F shift rolling freely and rattle to make a noise.

SUMMARY OF THE INVENTION

The above problem of the conventional apparatus taken into account, the present invention was made. The object of the present invention is to provide a linear guide apparatus which can be applied regardless of the shape of the guide rails; straight, curved or combination thereof, and which does not make much noise in operation.

In order to achieve the above object, the linear guide apparatus according to the present invention is comprised of guide rails which are provided with rolling grooves for rolling members elongated in the axial direction in both side surfaces; a slider which movably straddle the guide rails, and which has rolling grooves for the loaded rolling member formed in the inner side surfaces opposite to the rolling grooves for the rolling members of the guide rails and circulation paths for the rolling members which are formed to be communicated with the rolling grooves for the loaded rolling members and constitute, together with these rolling grooves for the loaded rolling members, endless circulation paths; and a multitude of the rolling members which roll in the endless circulation paths of the slider and carry the load between said rolling grooves for the rolling members opposite to each other. The guide rails include straight portions and curved portions curved with predetermined curvature, wherein a pair of upper and lower rolling grooves for the rolling members parallel with each other is formed on each side surface of the straight and curved portions. On the other hand, a pair of upper and lower rolling grooves for the loaded rolling member opposite to said pair of rolling grooves of the guide rail is formed in each inner surface of the slider, wherein either upper or lower rolling groove for the loaded rolling members is elongated straight and the other curved with the same curvature as the curved portions of the guide rails.

In this constitution, when the slider moves along straight guide rails, all the balls in the straight rolling grooves among the rolling grooves for the loaded rolling members in the inner surfaces of the slider carry the load and move without rattle, while all the balls in the curved rolling grooves do not roll nor move in the endless circulation paths because of clearance provided between the balls and the ball rolling grooves of the guide rail. Thus noise is not made.

On the other hand, when the slider moves along curved guide rails, all the balls in the curved rolling grooves among the rolling grooves for the loaded rolling members carry the load and move without rattle, while all the balls in the straight rolling grooves do not roll nor move in the endless circulation paths because of clearance provided between the balls and the ball rolling grooves of the guide rail. Thus, in this case also the noise is not generated.

BRIEF DESCRIPTION OF THE DRAWINGS

FIG. 2 is a cross sectional view cut along II—II shown in FIG. 1.

FIG. 6 is a cross-sectional view cut along V—V shown in FIG. 4.

DESCRIPTION OF THE PREFERRED EMBODIMENT

Figure 1:
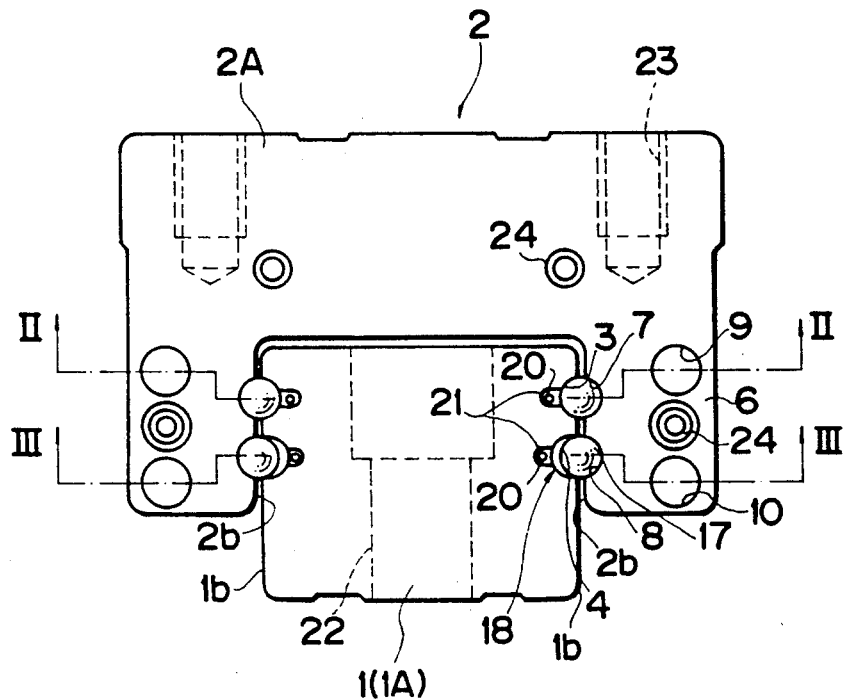
FIG. 1 is a front view of a linear guide apparatus according to the present invention with a straight guide rail, wherein an end cap is removed.

The embodiment of the present invention will be described below with reference to the drawings.

In FIGS. 1 to 6, the guide rail 1 has a pair of upper and lower rolling grooves 3 and 4 for the rolling members elongated in parallel with each other in the axial direction on each side surface 1b. The slider 2 having a U-shaped cross-section straddles the guide rail 1. The slider 2 comprises a slider main body 2A and end caps 5 for covering the front and rear ends of the slider main body 2A.

Pairs of upper and lower rolling grooves 7 and 8 for the loaded rolling members are formed in respective inner surface 2b, which are opposite to each other, of both sleeve portions 6 of the slider main body 2A, wherein the upper and lower rolling grooves 7 and 8 for the loaded rolling members are formed at an interval to be opposite to the rolling grooves 3 and 4 for the rolling members of the guide rail 1, respectively.

Pairs of upper and lower return paths 9 and 10 for the rolling members which penetrate straight through the thickness of respective sleeve portions 6 of the slider main body 2A are provided in the axial direction. Each end cap 5 has a pair of upper and lower curved paths 11 and 12 which have the semi-doughnut shape in its rear side in order to communicate said return paths 9 and 10 for the rolling member respectively with said upper and lower rolling grooves 7 and 8 for the loaded rolling members. Said rolling grooves 7 for the loaded rolling members, said return paths 9 for the rolling members and said two curved paths 11 attached to the front and rear ends of the slider main body 2A to communicate the rolling grooves 7 with the return paths 9 constitute the endless circulation paths 15 for the rolling members. Similarly, said rolling grooves 8 for the loaded rolling members, said return paths 10 for the rolling members and said two curved paths 12 attached to the front and rear ends of the slider main body 2A to communicate the rolling grooves 8 with the return paths 10 constitute the endless circulation paths 16 for the rolling members. The upper rolling grooves 7 for the loaded rolling members which are formed in respective inner surfaces of both sleeve portions of the slider main body and which are opposite to each other have straight shape, while the lower rolling grooves 8 for the loaded rolling members which are opposite to each other have circular arc shape having the common center 0 (having the same curvature). Incidentally, the straight rolling grooves 7 may be formed in the lower part of the inner surfaces 2b of the slider main body 2A. In this case, the curved rolling grooves 8 are formed in the upper part of the inner surfaces.

A multitude of balls serving as the rolling members are charged in respective endless circulation paths 15 and 16 for the rolling members so that the balls can roll therein.

Figure 4:
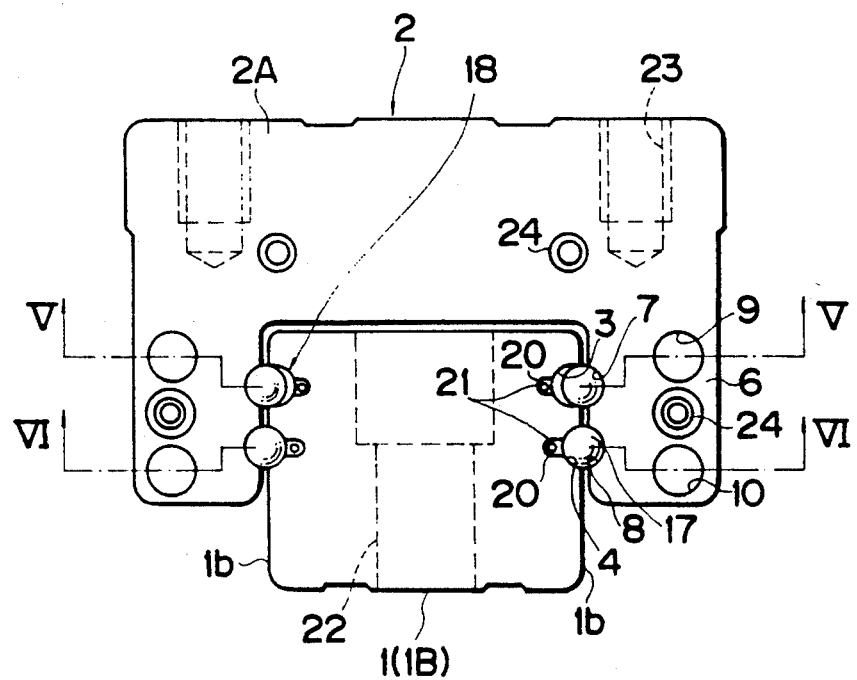
FIG. 4 is a front view of the linear guide apparatus according to the present invention with a curved guide rail, wherein the end cap is removed.
Figure 3:
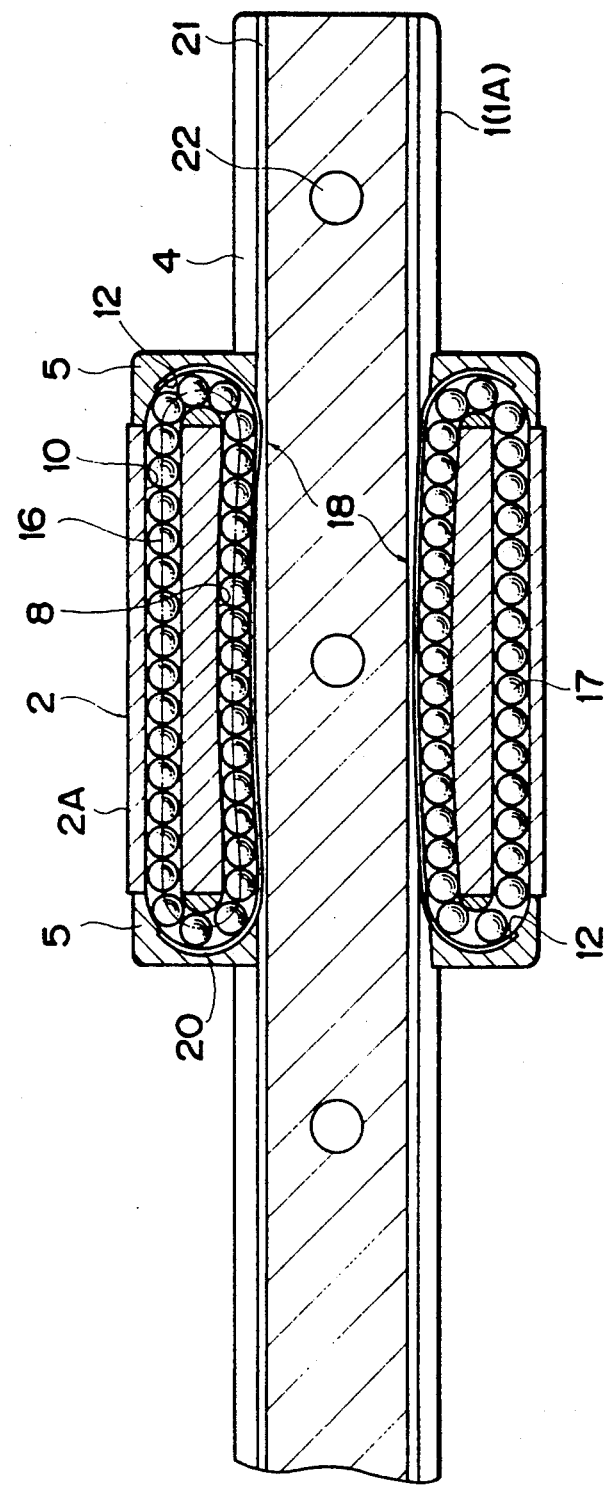
FIG. 3 is a cross-sectional view cut along III—III shown in FIG. 1.
Figure 5:
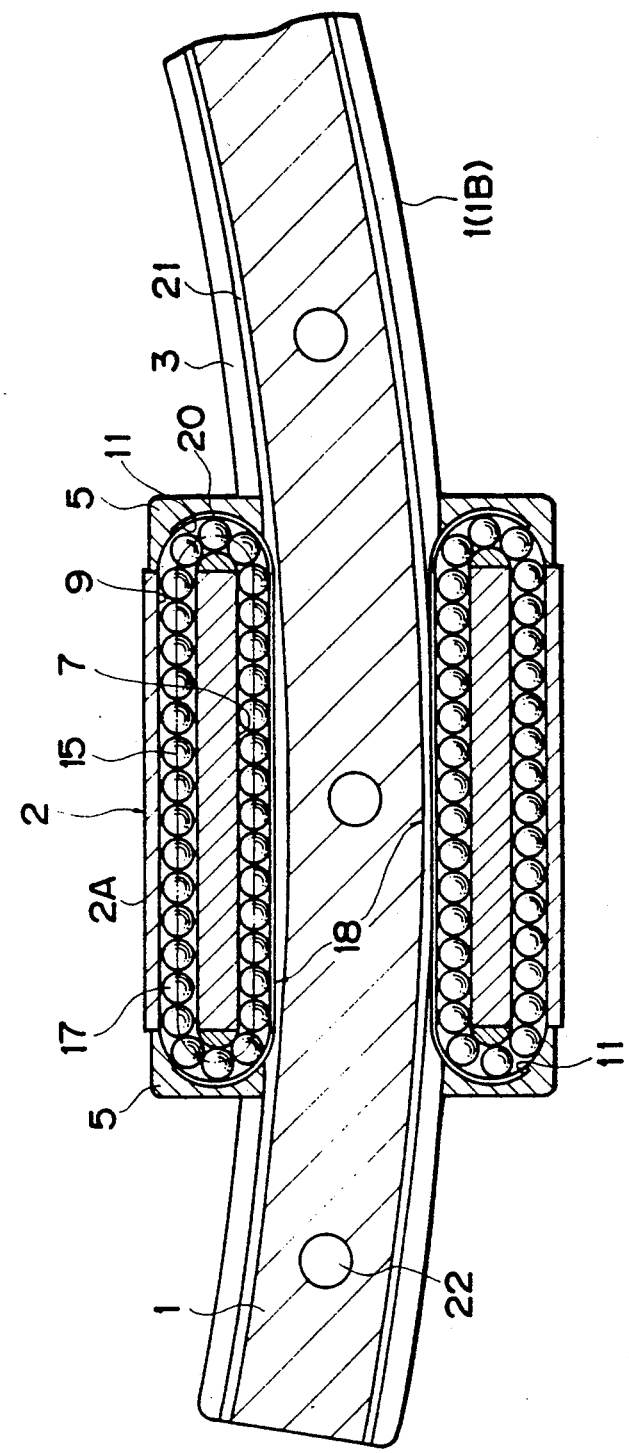
FIG. 5 is a cross-sectional view cut along IV—IV shown in FIG. 4.
Figure 8:
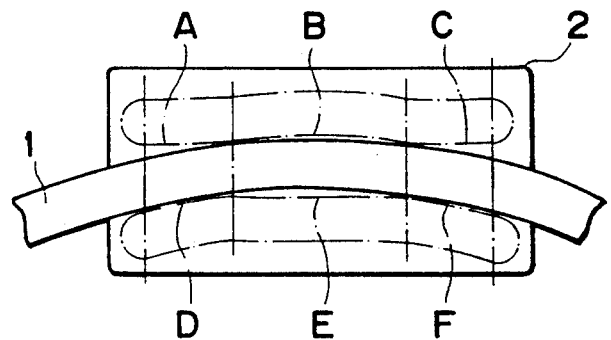
FIG. 8 is a schematic view explaining operation of a conventional linear guide apparatus.

Now, the above-mentioned guide rails 1 will be described in detail. The guide rails 1 includes straight guide rails 1A as shown in FIGS. 1 to 3, and curved guide rails 1B having a certain amount of curvature (certain amount of radius around a center) as shown in FIGS. 4 and 5.

A straight guide rail 1A has upper rolling grooves 3 for the rolling members which are formed to be opposite to respective straight rolling grooves 7 for the loaded rolling members of the slider 2, wherein the dimensions (depth) of the grooves 3 are determined so as to provide a predetermined interference to the balls 17 in the grooves 3. On the other hand, lower rolling grooves 4 for the rolling members which are formed to be opposite to the curved rolling grooves 8 for the loaded rolling members have such dimensions as provide clearance 18 between the grooves 8 and the balls 17 in the grooves 4.

A curved guide rail 1B is formed in the curved shape having the same curvature as the rolling grooves 8 for the loaded rolling members of the slider 2. The curved guide rail 1B has upper rolling grooves 3 for the rolling members which are formed to be opposite to respective straight rolling grooves 7 for the loaded rolling members of the slider 2, wherein the dimensions of the grooves 3 are determined so as to provide clearance 18 between the grooves 7 and the balls in the grooves 3. On the other hand, lower rolling grooves 4 for the rolling members which are formed to be opposite to the curved rolling grooves 8 for the loaded rolling members have such dimensions as provide a predetermined interference to the balls 17 in the grooves 4.

Figure 7:
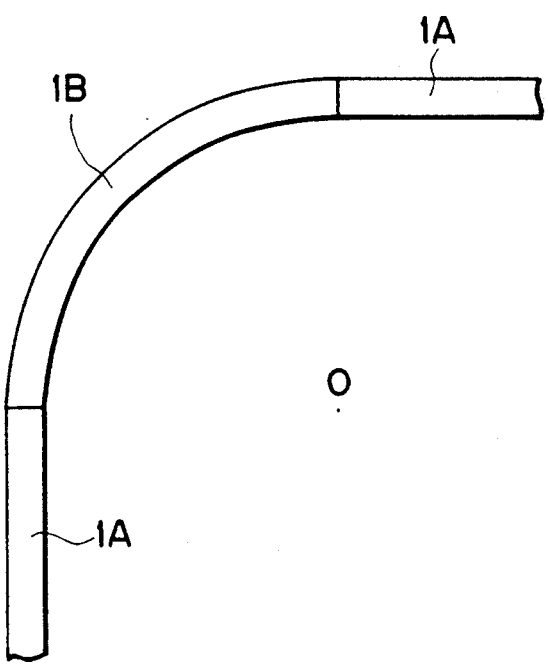
FIG. 7 is an explanatory view showing connections of the guide rails.

The straight guide rails 1A and curved guide rails 1B are connected as illustrated in FIG. 7.

Note that reference numeral 20 in FIGS. 1 to 5 denotes wire-type holders for holding the balls in order to keep the balls 17 from coming off from the rolling grooves 7 and 8 for the loaded rolling members of the slider 2. Engaging grooves formed in the inner surfaces of the curved paths 11 and 12 of the end caps 5 engage with end portions of the holders 20 to support the holders 20. On the other hand, retainer holding grooves 21 are formed at the innermost portions of the inner surfaces of respective rolling grooves 3 and 4 for the rolling members of the guide rail so that the holders 20 are prevented from interfering with the guide rail 1 and obstructing, rotation of the balls 17 while the slider moves. Holes 22 for fixing bolts which penetrate through the guide rail 1 from the top to the bottom are provided to fix the guide rail 1 to a base, or the like. Holes 23 for fixing bolts are provided in the top surface of the slider 2 to fix the slider to a machine table, or the like. Holes 24 for fixing bolts are provided in the end surfaces of the slider main body 2A to fix the end caps thereto.

Next, operation of the above-mentioned embodiment will be described.

For example, as shown in FIG. 7, the guide rail 1 comprises a straight guide rail 1A, which is connected with a curved guide rail 1B, which is, in turn, connected with another straight guide rail 1A. Thus, a track which is curved in the middle with constant curvature is laid. As the slider 2 moves forward on the straight guide rail 1A, the balls 17 circulate in the endless circulation paths 15 for the rolling members. That is, the balls 17 which are in contact with the upper straight rolling grooves 7 for the loaded rolling members and the corresponding upper rolling grooves 3 for the rolling members of the guide rail 1A are given the load and rotated. At that time, the balls 17 move toward the opposite direction with respect to the moving direction of slider 2, that is, toward the rear end of the slider 2. Then, the balls move through the curved paths 11 in the end cap 5 and turn back through the return paths 9 for the rolling members toward the front end. Then, the balls move through the curved paths 11 in the other end cap 5 and turn back to return to the end of the rolling grooves 7 for the loaded rolling members. Thus, the balls 17 start rolling in the rolling grooves 7 for the loaded rolling members while carrying the load, thereby repeating the circulation (see FIG. 2).

During this time, the balls 17 between the lower curved rolling grooves 8 for the loaded rolling members and the corresponding lower rolling grooves 4 for the rolling members of the guide rail 1A do not roll, whether the sliders 2 moves or not. For, as shown in FIGS. 1 and 3, the balls 17 are not in contact with the inner surfaces of the lower rolling groove 4 for the rolling members of the guide rail 1A because of the clearance 18 between the balls 17 and the rolling grooves 4 of the guide rail 1A.

That is, when the slider 2 moves on the straight guide rail 1A, all the balls 17 in the straight rolling grooves 7 for the loaded rolling members of the slider 2 carry the load and roll without rattle, thereby making little noise. At the same time, all the balls 17 in the curved rolling grooves 8 for the loaded rolling members are not loaded. Accordingly, they do not roll nor circulate, thereby making no noise.

When the slider 2 further moves and engages with the curved guide rail 1B, the clearance 18 is made between the balls 17 in the upper straight rolling groove 7 for the loaded rolling members and the corresponding upper rolling grooves 3 for the rolling members (see FIGS. 4 and 5). Thus, the balls 17 are detached from the rail and do not roll nor circulate whether the slider 2 moves or not. Therefore the balls 17 do not rattle to make noise.

During this time, the balls 17 between the lower curved rolling grooves 8 for the loaded rolling members and the corresponding lower curved rolling grooves 4 for the rolling members of the guide rail 1B are in contact with the inner surfaces of both grooves 4 and 8, and are rotated. At that time, the balls 17 move toward the opposite direction with respect to the moving direction of slider 2, that is, toward the rear end of the slider 2. Then, the balls move through the curved paths 12 in the end cap 5 and turn back through the return paths 10 for the rolling members toward the front end. Then, the balls move through the curved paths 12 in the other end cap 5 and turn back to return to the end of the rolling grooves 8 for the loaded rolling members. Thus, the balls 17 start rolling in the rolling grooves 8 for the loaded rolling members while carrying the load, thereby repeating the circulation.

That is, when the slider 2 moves on the curved guide rail 1B, all the balls 17 in the curved rolling grooves 8 for the loaded rolling members of the slider 2 carry the load and roll without rattle, thereby making little noise. At the same time, all the balls 17 in the straight rolling grooves 7 for the loaded rolling members of the slider 2 are not loaded. Accordingly, they do not roll nor circulate, thereby making no noise.

As described above, the embodiment of the present invention does not make noise whether the guide rails 1 is straight (1A) or curved (1B) because the balls 17 do not rattle between the grooves of the rail and those of the slider. Thus quiet operation can be realized.

Incidentally, though the load is carried by either the balls 17 in the straight rolling grooves 7 for the loaded rolling members of the slider 2 or the balls 17 in the curved rolling grooves 8 for the loaded rolling member, the total number of the balls 17 carrying the load is substantially the same as that of the conventional double-groove type apparatus, in which the straight load carrying region(s) and the curved load carrying region(s) are alternatively provided in the same rolling groove for the loaded rolling members. Therefore, load carrying capacity of this embodiment is substantially the same and as sufficient as that of the conventional apparatus of the same dimensions.

As described above, according to the present invention, the linear guide apparatus of ball circulation type has a pair of upper and lower rolling grooves for the loaded rolling members in each inner surface of the slider, wherein one of these upper and lower grooves is straight and the other curved with predetermined curvature. As a result, the balls in only one of these rolling grooves for the loaded rolling members, according to the shape of the guide rails, carry the load and roll without rattle, while the balls in the other rolling grooves for the loaded rolling members do not roll nor circulate because of clearance between the rolling grooves of the guide rail and themselves. Accordingly, noise is not made in either rolling grooves.

What is claimed is:

1. A linear guide apparatus, including guide rails having rolling grooves for rolling members elongated in the axial direction in both side surfaces, a slider movably straddling said guide rails and having rolling grooves for loaded rolling members formed in the inner surfaces corresponding to the rolling grooves for the rolling members of the guide rail and circulation paths to be connected with said rolling grooves for the loaded rolling members and constitute, together with these rolling grooves for the loaded rolling members, endless circulation paths, and a multitude of rolling members which roll in the endless circulation paths of the slider and carry the load between said rolling grooves for the rolling members opposite to each other, wherein the guide rails include straight portion elongated linearly and curved portion curved with predetermined curvature, and a pair of upper and lower rolling grooves for the rolling members parallel with each other are formed on each side surface of the straight and curved portions;

a pair of upper and lower rolling grooves for the loaded rolling members opposite to said pair of rolling grooves of the guide rail are formed in each inner surface of the slider, and one of upper and lower rolling grooves for the loaded rolling members are elongated straight and the other are curved with the same curvature as the curved portion of the guide rails.

2. A linear guide apparatus according to claim 1, wherein balls in the straight rolling grooves for the loaded rolling members of the slider carry the load when the slider moves on the straight guide rail, while balls in the curved rolling grooves for the loaded rolling members do not carry the load.

3. A linear guide apparatus according to claim 1, wherein balls in the curved rolling grooves for the loaded rolling members carry the load when the slider moves on the curved guide rail, while balls in the straight rolling grooves for the loaded rolling members do not carry the load.

* * * * *